United States Patent
Holzman et al.

[11] Patent Number: 6,064,401
[45] Date of Patent: May 16, 2000

[54] USER INTERFACE CONTROLS FOR ADJUSTING THE DISPLAY OF MULTI-DIMENSIONAL GRAPHICAL PLOTS

[75] Inventors: Thomas G. Holzman, Marietta; Wesley G. Hunter, Doraville; Mark A. Jacobson, Marietta, all of Ga.

[73] Assignee: NCR Corporation, Dayton, Ohio

[21] Appl. No.: 09/085,929

[22] Filed: May 28, 1998

[51] Int. Cl.$^7$ .................................................. G06T 17/00
[52] U.S. Cl. .............................................................. 345/440
[58] Field of Search .................................. 345/433, 434, 345/435, 440, 441, 442, 443

[56] References Cited

U.S. PATENT DOCUMENTS

| | | | |
|---|---|---|---|
| 5,896,139 | 4/1999 | Strauss | 345/440 |
| 5,917,499 | 6/1999 | Jancke et al. | 345/440 |
| 5,929,864 | 7/1999 | Picott et al. | 345/440 |
| 5,953,009 | 9/1999 | Alexander | 345/440 |
| 5,982,383 | 11/1999 | Kumar et al. | 345/440 |

*Primary Examiner*—Phu K. Nguyen
*Assistant Examiner*—Cliff N. Vo
*Attorney, Agent, or Firm*—Needle & Rosenberg

[57] ABSTRACT

The present invention provides a user interface mechanism for adjusting the view of two-dimensional graphical plots so users can make compromises between the amount of detail that is presented on an electronic display and the range of data that can be within immediate view. It also provides a mechanism for controlling the subset of data that will be within view on an electronic display when the entire data plot exceeds the dimensions of the display. Finally, it provides a mechanism whereby a sliding lens may be selectively positioned over various portions of a graph, allowing the viewing of the graph at a selectable magnification.

13 Claims, 5 Drawing Sheets

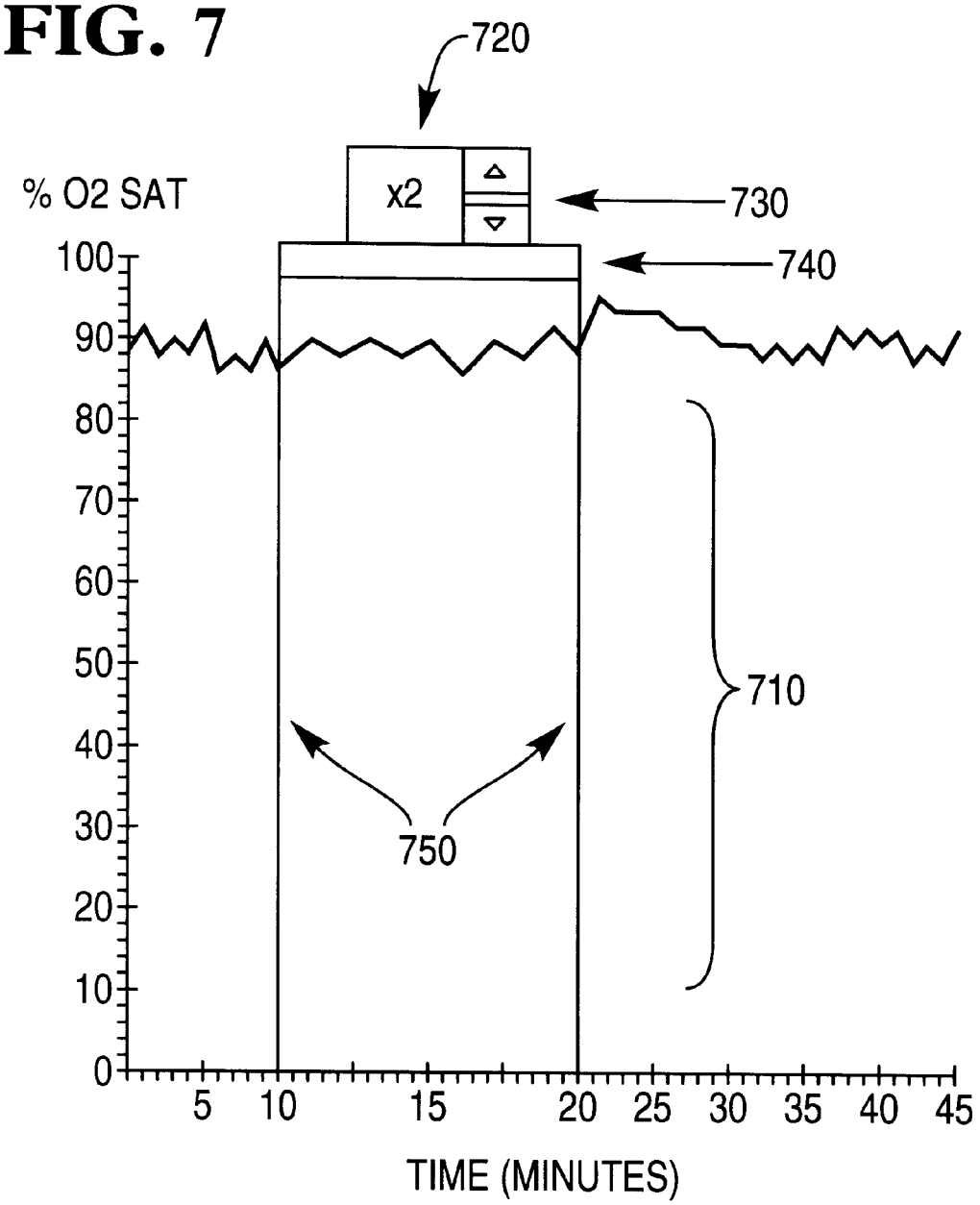

USER INTERFACE CONTROLS FOR ADJUSTING THE DISPLAY OF MULTI-DIMENSIONAL GRAPHICAL PLOTS

BACKGROUND OF THE INVENTION

1. Field of the Invention

This invention provides a means for adjusting the view of two-dimensional graphical plots so users can make appropriate compromises between the amount of detail that is presented on an electronic display and the range of data that can be within view at any given time. The present invention also provides a mechanism for the user to control the subset of data that will be within view on an electronic display when the entire data plot exceeds the dimensions of the display.

2. Description of the Prior Art

Various electronic devices, such as computer graphical user interfaces and some real-time display monitors (e.g., physiological monitors), graphically depict measurements taken on some object over time. These depictions sometimes take the form of points, or lines between points, on two axes, with time generally indicated on the horizontal axis and the magnitude of the reading indicated on the vertical axis.

Depending on how frequently points are plotted (e.g., a measurement plotted every second versus every minute) and on how long the data recording has been taking place, it may not be possible for all of the plot to be within view on a video display at one time. With current approaches to graphically displaying data captured in real time, some of the points or lines must move off of the display to make room for more recently occurring ones. For example, assume that a physiological sensing device is automatically taking a person's pulse at 30-second intervals. These readings are then plotted on a two-dimensional graphical display, with a line connecting each point. If each reading is plotted approximately 1 centimeter apart, the display (e.g., computer screen) will be out of space for additional plots in less than 30 minutes. However, the user may want to see much or all of the data at once, including previously plotted data that would normally be off the display if the recording had been going on for a long time. This is not readily accommodated by existing user interfaces for viewing graphical data depictions.

Additionally, the user may wish to go back and forth quickly between points that are widely separated and not simultaneously in view, making comparisons between them (e.g., comparing a person's pulse before administration of a drug and one hour afterward). Current user interface approaches do not readily accommodate these desires to move one's view back and forth along an axis.

Current conventional approaches to graphical plots use a constant resolution, or scale, throughout the range of data being captured. However, users may be interested in fine detail for some parts of the plot but may be satisfied with a coarser view at other times. More refined user control of the resolution of the graphical data representation is needed to accomplish this than what is currently available.

SUMMARY OF THE INVENTION

This invention introduces three graphical controls with which users can adjust their views of data plotted on two axes of an electronic display. It assumes a mechanism for storing data that have been input to or monitored by an information system so that the data can be accessed at a later time even if they are not currently shown on the video display.

Pull-and-push Axes. The first control allows the user to adjust how tightly packed the various data are along their axes. When the user moves the graphical pointing device (e.g., mouse pointer, electronic pen, etc.) over the axis that is to be stretched or pulled, the pointing device changes shape to indicate that it is ready to grab the axis. By holding down the mouse button (or by continuing to hold the electronic pen or other touch-sensitive pointer to the axis), the user can then pull and stretch the axis, thus separating the points that are plotted, or push and compress the axis, thus narrowing the space between plotted points. The axis pull allows the user to more clearly separate points on the graph for closer examination of their precise values. The axis push allows the user to bring more points into the immediate field of vision on the display by reducing the separation between them.

Scrollable Dynamic Axis. Whatever the distance between points on an axis measuring elapsed time (usually the horizontal axis), eventually the time axis will not have enough space to continue to plot the same units of time (e.g., seconds) and keep them all within immediate view. The present invention automatically displays a scroll bar parallel to the time axis when space runs out for depicting all data along a particular axis (e.g., a dynamically updated horizontal axis indicating the times at which data points were recorded). The plot of the graphical trend automatically begins scrolling so that the most recently plotted point is at one end of the axis (normally the extreme right) and the earliest plotted point that will fit within view is at the other end of the axis (normally the extreme left). At any time, the user can take advantage of a slider scroll bar control to bring back into view a point that has passed out of view (removing from view the most recently plotted point). Likewise, the scroll bar control can then be used to move forward to more recently plotted values.

The present invention may be applied to any axis (not just time or the horizontal axis) that has a range which increases as a result of either automatic data inputs or inputs made by the user, eventually outgrowing the space available to display all its units within immediate view. For example, it may also be applied to plots of cumulative data for which the range can eventually extend beyond what can be in immediate view at one time.

Sliding Lens. The present invention includes a mechanism for adjusting the separation of points in a selected portion of an axis. This allows the user to have quite a few relatively compressed points within immediate view at any given moment, but allows the user to "blow up" a selected portion of a plot for detailed inspection. This is accomplished by a "lens" that the user can slide along the axis to further separate points that fall beneath it. The lens includes a "power," or magnification, control that allows the user to adjust the degree of separation of points that will result from passing the lens over them.

Although it is anticipated that the lens will be more often implemented and used to magnify portions of a graphical plot, the power control can also be implemented to allow powers less than 1, enabling the user to compress the portion of the graph under the lens. Just as the pull and push functions previously described can be applied to the horizontal or vertical axis, a lens can be applied to either axis.

Relationship among the controls. The three major user interface controls described as part of the present invention can be implemented individually or in combination with each other.

BRIEF DESCRIPTION OF THE FIGURES

FIG. 7 illustrates the controls and indicators associated with the Sliding Lens of the present invention and the effect of the Sliding Lens on the display of a graphical plot of data.

DETAILED DESCRIPTION OF THE INVENTION

A preferred embodiment of the invention is now described in detail. Referring to the figures, like numbers indicate like parts throughout the views.

Figure 1:
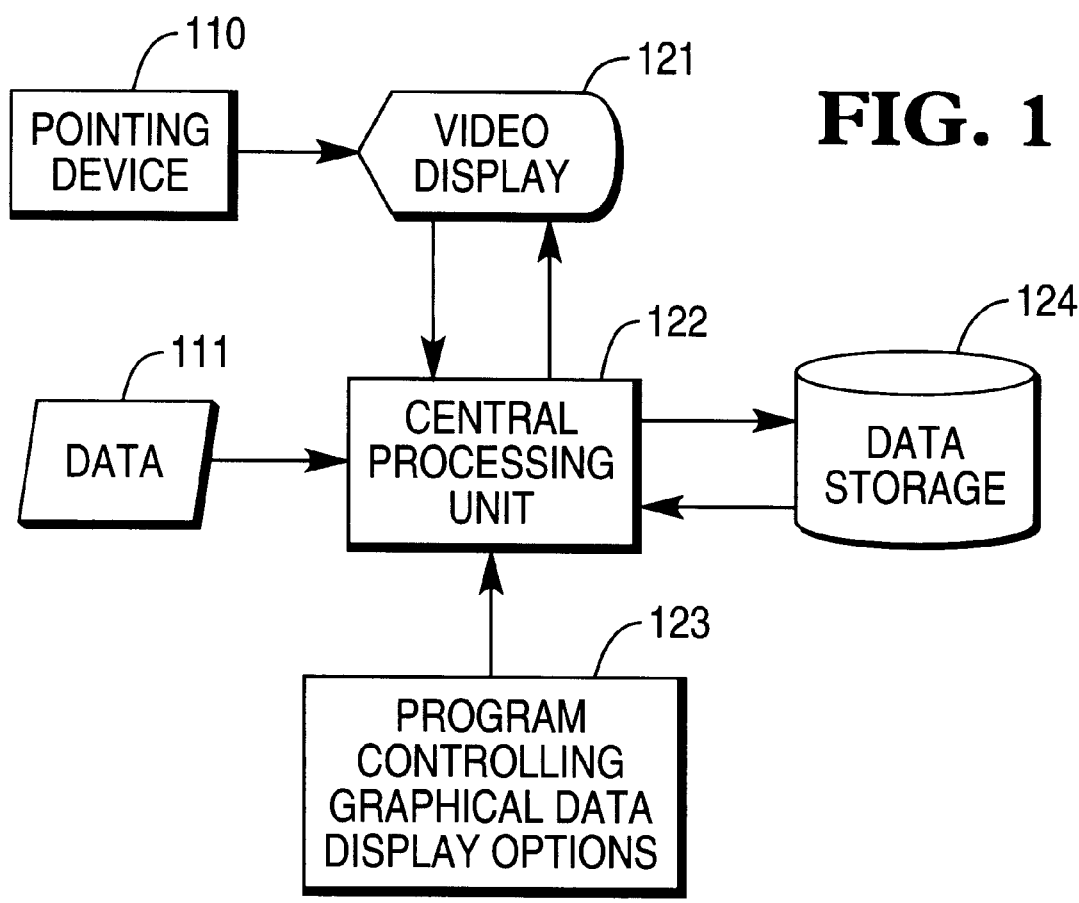
FIG. 1 illustrates the major hardware, software, and data components of the present invention and the interactions among them.
Figure 2:
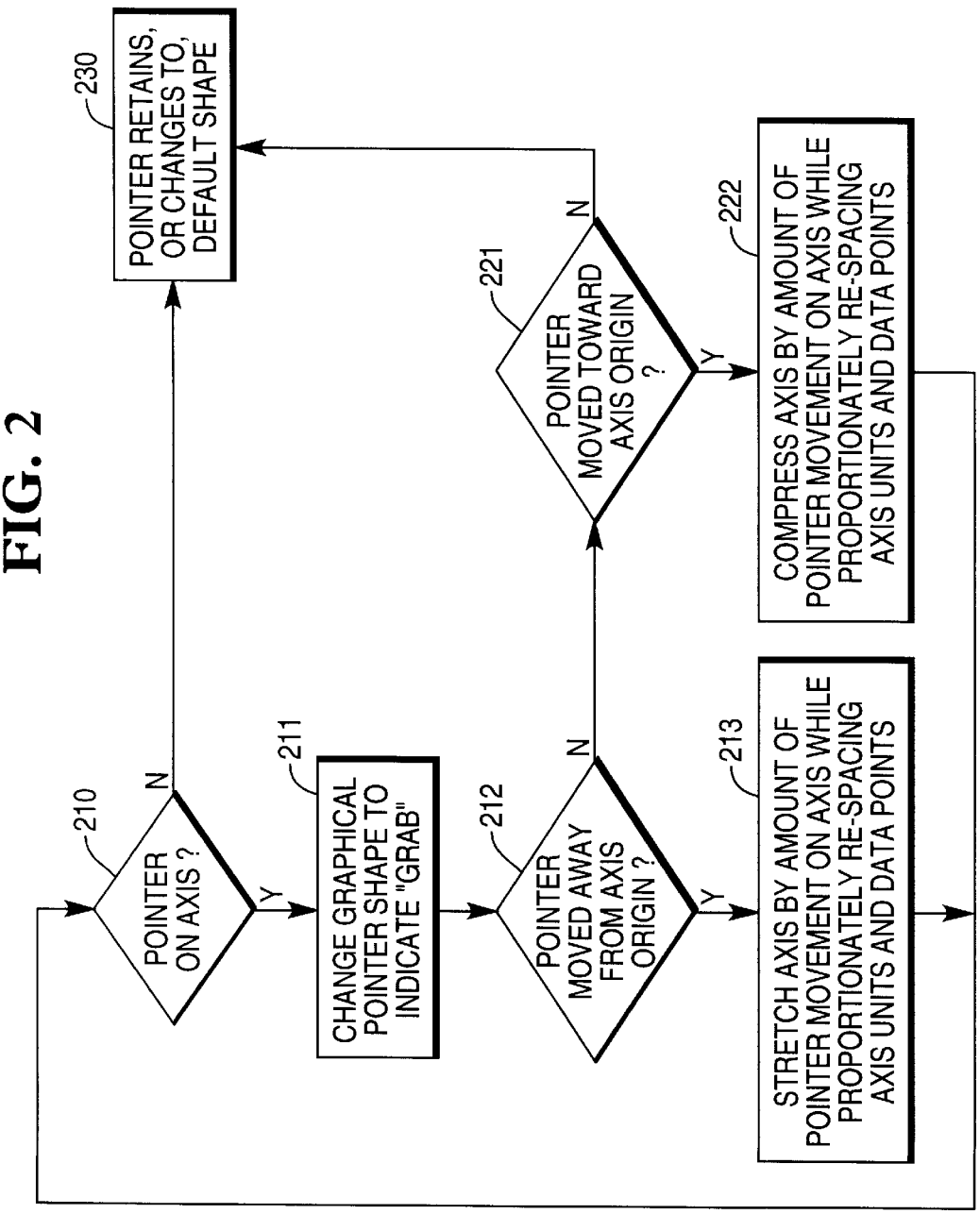
FIG. 2 is a block diagram identifying key elements and user interface mechanisms of the present invention for expanding and compressing the spread of data points along an axis.

The present invention introduces three graphical controls with which users can adjust their views of graphical data plots on two axes. High level depictions of the major data, software, and hardware components that may be used with the teachings of the present invention, in one embodiment, and the interactions among them, are shown in FIG. 1.

The present invention assumes that Data 111 are input to some kind of Central Processing Unit (CPU) 122, which may be a general purpose computer or some more specialized electronic processing device, such as part of a physiological monitor. The data could be input through a variety of methods (e.g., batch entry, keyed individually by a user, or automatically input in real time through some type of monitoring device). The present invention has significant usability benefits regardless of the manner in which data are input, but its biggest advantages may be realized for situations involving automatic, real time input of measurements (e.g., data coming from continuous monitoring of some event, such as physiological monitors that provide electronic data output). Consequently, the illustrations in this description will focus on those contexts of use, although the invention is not restricted to those contexts.

The invention also assumes some type of Data Storage 124. This allows Data 111 that have been input to the system to be retained by it rather than simply being depicted on a Video Display 121 and then lost as they are replaced on the Video Display by more recently input Data 111. The Central Processing Unit 122 governs Data input to and retrieval from Data Storage 124.

The way that the Central Processing Unit interacts with the Data and peripheral devices for the implementation of this invention is governed by a Program Controlling Graphical Data Display Options 123. That program can be stored in any of a variety of hardware devices (e.g., random access memory, magnetic storage, read-only memory, etc.), depending on the precise context in which the invention is implemented.

As shown in FIG. 1, this invention provides a graphical user interface that permits the user to control depiction of the Data 111 through a Pointing Device 110 (e.g., mouse electronic pen, or finger pressing on a touch sensitive Video Display), which interacts with the Video Display 121. The Video Display 121 may be a cathode ray tube (CRT) or any other type of electronic device that can graphically depict data processed by a computer, electronic monitor, etc. From the user's point of view, the Pointing Device 110 interacts directly with the Video Display 121. However, depending on the particular hardware implementation of the invention, the Pointing Device's 110 interaction with the Video Display 121 might first involve interaction with the Central Processing Unit 122. This would be the case if the Pointing Device were a mouse, since the mouse may be attached directly to the Central Processing Unit 122 and not to the Video Display 121. However, if an electronic pen or other Pointing Device 110 were used with a Video Display 121 that was touch sensitive, for example, the Pointing Device 110 would make its initial contact directly with the Video Display 121, which would, in turn, interact with the Central Processing Unit 122.

Having described the framework for implementation, the particulars of the graphical user interface controls provided by the present invention will be described in the immediately following subsections. Each subsection will deal with a different control included in the invention. For purposes of the present description, the various steps and processes described below with respect to FIGS. 2–7 may be performed by CPU 122, or an equivalent processing system.

Pull-and-push Axes. The below description of the "Pull-and-push Axes" control will refer to the various elements of FIG. 1 through FIG. 4 and their numerically identified parts. This control allows the user to adjust how tightly packed the various data points are along their axes when shown on the Video Display 121. When the user moves the Pointing Device 110 (e.g., mouse pointer, electronic pen, etc.) so that a pointer appears over the axis that is to be stretched or pulled 210 on the Video Display 121, the Program Controlling Graphical Display Options 123 instructs the Central Processing Unit 122 to change the pointer's shape 211 on the Video Display 121. The changed pointer shape 410 indicates that it is ready to "grab" and manipulate the axis.

By holding down the mouse button (or by continuing to hold the electronic pen or other touch-sensitive pointer to the axis) and moving the "grab" pointer 410 away from the origin of the manipulated axis 212, the user can pull and stretch the axis 213, thus separating the points that are plotted. The farther the user pulls on the elastic axis, the greater becomes the separation between each unit on the scale. If the axis is pulled far enough, some data points may no longer be within immediate view. However, such data remain in Data Storage 124, from where they can be accessed and re-displayed later.

The user may also move the grab pointer toward the origin of the manipulated axis 221. This compresses the axis 222, thus narrowing the space between plotted points. The more the user pushes toward the origin of the scale, the more compressed become the units on the scale being pushed. This compression may enable display of data from Data Storage 124 that were not visible on the graphical plot before the pushing action. When the coordinate of the Pointer does not match that of the axis that can be manipulated, the pointer retains, or returns to, its normal graphical pointer shape 230.

Figure 3:
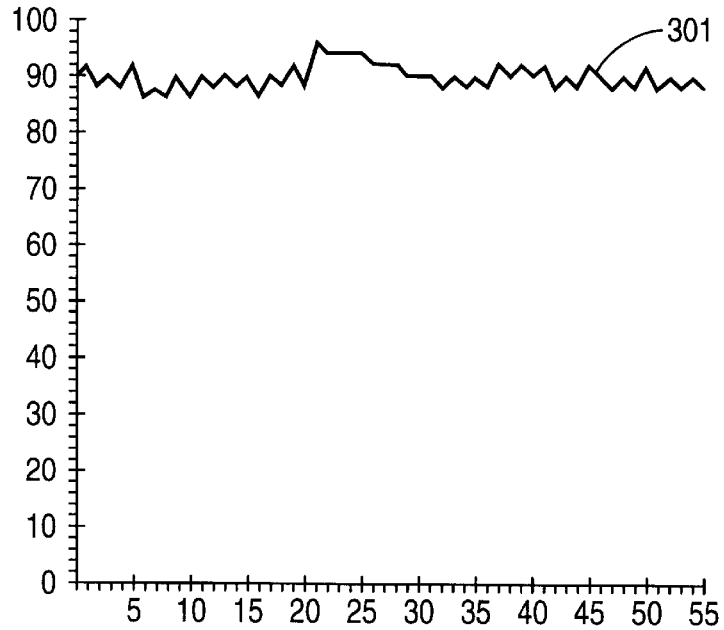
FIG. 3 illustrates a graphical trend prior to expanding or compressing the spread of its data points.

The axis pull allows the user to more clearly separate points on the graph for closer examination of their precise values. For example, FIG. 3 shows a graphical plot 300 of oxygen saturation 301 (on a scale from 0 to 100%) across time (in minutes). There is variability in the readings, and it may be difficult to tell the precise time at which the highest reading was reached, since the time scale is quite compressed.

Figure 4:
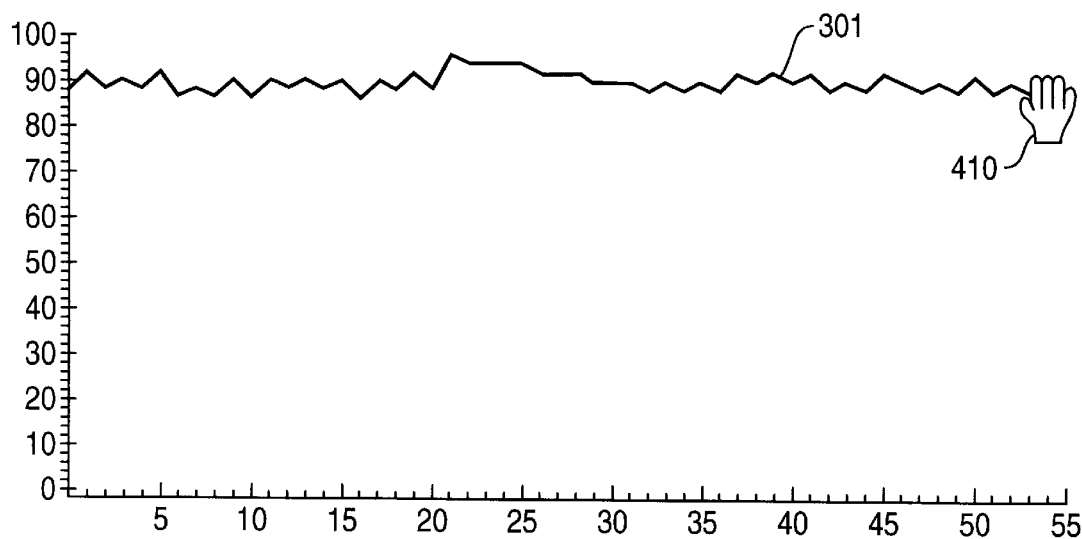
FIG. 4 further illustrates FIG. 3, showing how the present invention allows the data points and their axis to be "pulled" apart by the interface mechanisms of the present invention.
Figure 5:
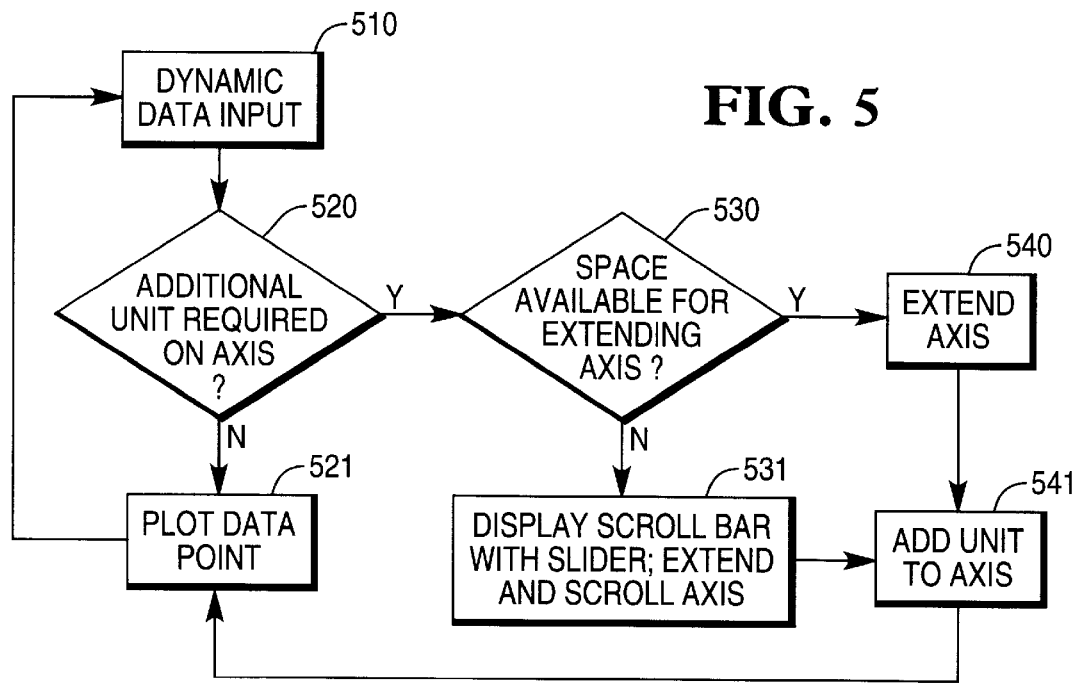
FIG. 5 is a block diagram identifying key elements and user interface mechanisms of the present invention for dynamically extending and scrolling an axis as additional data are plotted.

A physician or medic might want to take a closer look at how a patient's oxygen saturation level responded at the moment of a medical treatment to determine its effectiveness. This could be better determined if the time scale were separated out further to make it easier to see the minute at which the highest oxygen saturation value was recorded. By pulling (via "hand" 410) out the horizontal axis, as illustrated in FIG. 4, it becomes easier to distinguish the times that correspond to the various oxygen saturation values.

The axis push allows the user to bring more points into the immediate field of vision on the display 121 by reducing the separation between them. Such a compression may not result in the loss of much, if any, information, if the values of the points on the one axis don't change very rapidly with changes in the values of the points on the axis that is being compressed. In fact, in such situations, the compression can make subtle trends more obvious. Again taking a medical example, if a patient's oxygen saturation were falling very gradually, perhaps due to exposure to a chemical that impaired the lungs, this downward trend could be more readily detected if the time units plotted on the horizontal axis were compressed, allowing the user to see a steady decline on the vertical axis by comparing the first oxygen saturation value that was recorded with the last one.

Scrollable Dynamic Axis. The description of the "Scrollable dynamic axis" system will refer to FIG. 1 and FIGS. 5–6, and their respective numerically identified parts. When data are input dynamically 510 for real-time plotting 521 (e.g., when time is being plotted on one axis or when cumulative data are being plotted on an axis), it is possible to eventually run out of space on the Video Display 121 for adding to the length of the axis 540 and marking off additional units on that axis 541 that can be kept within view of the user.

The present invention automatically displays a scroll bar 531 parallel to the dynamic axis when space runs out for dynamically updating the display of units on their axis 530 as the event unfolds. With the present invention, when there is no space available for adding units to the axis 530, the Program Controlling Graphical Display Options 123 instructs the Central Processing Unit 122 to show on the Video Display 121 a scroll bar with slider control, "lengthen" the axis, and scroll it. When space is available within immediate view for adding another unit to the axis (e.g., adding a unit of time, such as having the axis mark off six one-minute intervals instead of just five), the Program Controlling Graphical Data Display Options 123 instructs the Central Processing Unit 122 to add another unit to the axis 540 shown on the Video Display 121 to allow plotting of a new data point 521 with a coordinate that goes beyond what could have been plotted on the pre-existing axis.

Figure 6:
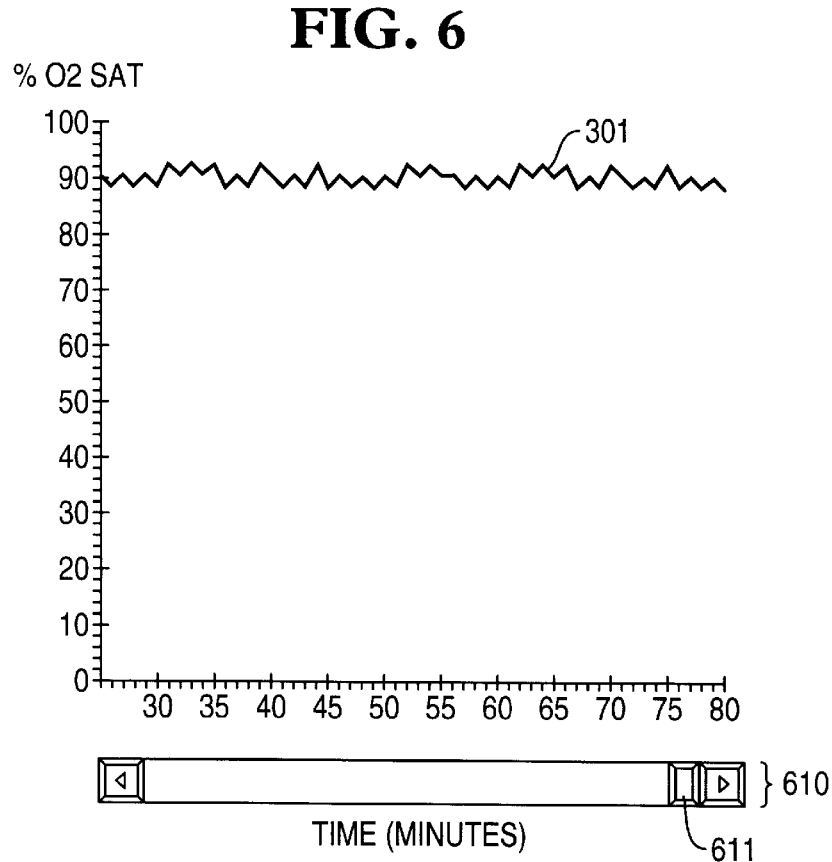
FIG. 6 illustrates the controls and indicators associated with the Scrollable Dynamic Axis function of the present invention.

FIG. 6 illustrates the scrollable dynamic axis for a medical example, in which a patient's oxygen saturation (O2 Sat) level is being continually monitored, resulting in the need to increase the length and measurement units on the time axis. In this example, a maximum of 55 minutes can remain in view at any given time. Once that is exceeded (80 minutes have elapsed in this example), the scroll bar with slider automatically appears.

As the axis scrolls, the data that are removed from immediate view remain in the system's Data Storage 124. At any time, the user can take advantage of the slider on the scrolling control to bring back into view a point that has passed out of view values (before the 25 minute point in this example), thus removing from view the more recently plotted points. Likewise, the slider can then be used to return to more recently plotted values.

The present invention generalizes to any axis (not just time) that is automatically updated or modified by the user so that its range outgrows the space available to display all its units within immediate view and with the same degree of spatial separation between them as originally existed.

Sliding Lens. The present invention allows the user to adjust the separation of points on a selected portion of an axis. The user accomplishes this by sliding a graphical "lens" across the axis. The points that fall under the lens are "magnified" (further separated) or further compressed, depending on the "power" at which the lens is set. The lens multiplies the distance between the points by its power setting (e.g., a power setting of 2 doubles the distance between points, whereas a power setting of 0.5 halves the distance).

It is expected that most of the time this control will be implemented and used to selectively magnify, or "blow up," a portion of the axis. This allows the user to have a relatively large number of points within immediate view, but allows for closer inspection of a subset of those points that are of particular interest. As the lens is slid along the axis by dragging it with a pointing device (e.g., mouse, or pen or finger tip working with a touch-sensitive screen), the points that come underneath it are made more discrete by being spread further apart on the axis along which the lens is sliding, while the points that pass out of its scope return to their original, more compressed arrangement.

FIG. 7 illustrates the Sliding Lens control. In this case, it will be noted that the points under the lens 710 are further spread out on the horizontal axis than are the points outside of the lens. In fact, there is twice as much distance between time units under the lens than those outside of it. As indicated in FIG. 7, the Sliding Lens can include a "power," or magnification control 730 that allows the user to adjust the degree of separation of points that will result from passing the lens over them as well as a Power Indicator 720. The reason why the points under the lens are twice as far apart as those outside of it is because the user has set the power to be 2 in this case, as indicated by the Power Indicator 720. By pressing the up and down arrows next to the Power Indicator, the user can increase and decrease the power of the lens. This control can be set so that, when the user adjusts it below a value of 1, it provides either fractions or decimal numbers with values greater than 0 and less than 1, allowing the user to compress the points that fall under the lens rather than expanding them.

The Sliding Lens illustrated in FIG. 7 has a Lens Handle 740, which controls movement of the Lens along its axis. The user may "grasp" the Handle by moving the pointer over it, holding it on the Handle, and then moving the pointer in the direction desired for moving the Sliding Lens. This would work in a similar manner to the way in which users can slide windows in most graphical user interfaces (e.g., Windows 95) by moving the pointer over the shaded title area at the top of the window, holding the left mouse button down, and then moving the pointer to move the window to a new position. The main difference is that the Sliding Lens can only be moved along its axis, in one embodiment.

With the present invention, the user can also adjust the width of the lens in a similar manner to which widths of windows can be adjusted in graphical user interfaces (e.g., Windows 95) by holding onto a side of a window with the pointer and then moving the pointer. If the user moves the pointer over either border 750 of the Sliding Lens, the pointer shape changes to a double-headed arrow. By continuing to hold the pointer on that border and pressing the left mouse button (or whatever mechanism is used to control selection by the pointer) while moving the pointer, the user can expand or contract the width of the Sliding Lens.

Just as the pull and push functions previously described can be applied to the horizontal or vertical axis, a sliding lens can be applied to either axis. A vertical magnification could be quite helpful in this example since oxygen saturation values vary within a very restricted range in most individuals, as illustrated in FIG. 7. The user might want to slide a lens on the vertical axis and place it over an area running from 80 to 100% to better determine the oxygen saturation values that are clustered in that range.

Combining mechanisms. Note that all three major functions described in the present specification can also be used in combination with each other. For example, the scroll bar with slider could be used in conjunction with the magnifier. To compensate for the extra space required to "blow up" the area along one part of the axis, some non-magnified parts of that axis might not have sufficient space to be displayed. However, a scroll bar with slider could appear at that point, allowing the user to bring back into view any values of interest. Likewise, this scrollable axis function could be applied to axes besides those indicating time. For example, if the user applied a magnifier to the vertical axis and there was no longer sufficient space to include all of the oxygen saturation values within immediate view, a slider could be displayed so that the user could scroll up and down the vertical axis to look anywhere along the axis indicating oxygen saturation values.

Although the techniques described here were illustrated with medical or physiological examples, this was merely done to provide some concrete examples and not to restrict the domain of coverage. In fact, these techniques can be easily applied to any domain in which data are depicted along two or more axes, regardless of the variables assigned to those axes.

What is claimed is:

1. A system for manipulating graphical output, comprising:
   (a) a storage means for storing a data structure having at least one dimension, the data structure including a plurality of data elements, each data element having at least one value for each of the at least one dimension;
   (b) a video display means for displaying an image;
   (c) a pointing means, responsive to a user of the graphical output analyzing system, for generating a point signal corresponding to a location on the video display means, the pointing means including a drag switch which may be activated by the user; and
   (d) processing means for performing the steps of:
      (i) displaying a graph on the video display means corresponding to the data elements in the data structure, wherein each dimension of the graph is displayed at a selected resolution,
      (ii) receiving from the pointing means the point signal, and
      (iii) responsive to the activation of the drag switch by the user, if the point signal falls on a selected one of the at least one dimension,
         (1) receiving from the pointing means a new point signal, and
         (2) readjusting the selected resolution of the selected one of the at least one dimension responsive to the difference in corresponding location between the new point signal and the point signal.

2. The system of claim 1, wherein the readjusting step comprises the sub-steps of:
   (A) calculating a first distance between the location corresponding to the point signal and a selected reference location;
   (B) calculating a second distance between the location corresponding to the new point signal and the selected reference location; and
   (C) readjusting the selected resolution of the selected dimension, such that the new selected resolution is directly proportional to a ratio of the first distance to the second distance.

3. The system of claim 1, wherein the readjusting step comprises the sub-steps of:
   (A) calculating a first distance between the location corresponding to the point signal and a selected reference location;
   (B) calculating a second distance between the location corresponding to the new point signal and the selected reference location; and
   (C) readjusting the selected resolution of the selected dimension, such that the new selected resolution is increased if the first distance is greater than the second distance, and the new selected resolution is decreased if the first distance is less than the second distance.

4. A system for manipulating graphical output, comprising:
   (a) a storage means for storing a data structure having at least one dimension, the data structure including a plurality of data elements, each data element having at least one value for each of the at least one dimension;
   (b) a video display means for displaying an image;
   (c) a pointing means, responsive to a user of the graphical output analyzing system, for generating a point signal corresponding to a location on the video display means, the pointing means including a drag switch which may be activated by the user; and
   (d) processing means for performing the steps of:
      (i) displaying a graph on the video display means corresponding to the data elements in the data structure, wherein each dimension of the graph is displayed at a selected resolution,
      (ii) displaying a scroll bar along a selected dimension of the graph;
      (ii) receiving from the pointing means the point signal, and
      (iii) responsive to the activation of the drag switch by the user, if the point signal falls on the scroll bar,
         (1) receiving from the pointing means a new point signal, and
         (2) readjusting the placement of the graph on the video display along the selected dimension, wherein the point of the graph corresponding to the point signal is moved to a new location on the video display corresponding to the new point signal.

5. The system of claim 4, wherein the readjusting step comprises the sub-steps of:
   (A) calculating a first distance between the left of the scroll bar and the location corresponding to the point signal;
   (B) calculating a second distance between the left of the scroll bar and the location corresponding to the new point signal; and (C) readjusting the placement of the graph based upon the differences between the first distance and the second distance.

6. A system for manipulating graphical output, comprising:
   (a) a storage means for storing a data structure having at least one dimension, the data structure including a plurality of data elements, each data element having at least one value for each of the at least one dimension;
   (b) a video display means for displaying an image;
   (c) a pointing means, responsive to a user of the graphical output analyzing system, for generating a point signal corresponding to a location on the video display means, the pointing means including a drag switch which may be activated by the user; and
   (d) processing means for performing the steps of:
      (i) displaying a graph on the video display means corresponding to the data elements in the data structure, wherein each dimension of the graph is displayed at a selected resolution, and
      (ii) defining a region on the graph on the video display within which the graph is displayed at a selected magnification.

7. The system of claim 6, wherein the processing means performs the further steps of:
   (iii) receiving from the pointing means the point signal, and
   (iv) responsive to the activation of the drag switch by the user, if the point signal falls within the defined region,
      (1) receiving from the pointing means a new point signal, and
      (2) readjusting the location of the defined region on the video display means to a location corresponding to the new point signal.

8. The system of claim 6, wherein the processing means performs the further steps of:
   (iii) receiving from the pointing means the point signal, and
   (iv) responsive to the activation of the drag switch by the user, if the point signal falls within the defined region,
      (1) receiving from the pointing means a new point signal, and
      (2) readjusting the magnification of the defined region on the video display means responsive to the receipt of the new point signal.

9. The system of claim 6, wherein the magnification level is chosen wherein the graph in the region is enlarged.

10. The system of claim 6, wherein the magnification level is chosen wherein the graph in the region is made smaller.

11. A process for manipulating graphical output, comprising the steps of:
   (a) storing a data structure having at least one dimension, the data structure including a plurality of data elements, each data element having at least one value for each of the at least one dimension;
   (b) generating a point signal, via a pointing device, corresponding to a location on a video display, the pointing device including a drag switch which may be activated by the user; and
   (c) displaying a graph on the video display corresponding to the data elements in the data structure, wherein each dimension of the graph is displayed at a selected resolution,
   (d) receiving a point signal from the pointing device;
   (e) responsive to the activation of a drag switch of the pointing device, if the point signal falls on a selected one of the at least one dimension,
      (1) receiving from the pointing device a new point signal, and
      (2) readjusting the selected resolution of the selected one of the at least one dimension responsive to the difference in corresponding location between the new point signal and the point signal.

12. A process for manipulating graphical output, comprising the steps of:
   (a) storing a data structure having at least one dimension, the data structure including a plurality of data elements, each data element having at least one value for each of the at least one dimension;
   (c) generating a point signal, via a pointing device, corresponding to a location on the video display, the pointing device including a drag switch which may be activated by the user;
   (d) displaying a graph on the video display corresponding to the data elements in the data structure, wherein each dimension of the graph is displayed at a selected resolution,
   (e) displaying a scroll bar on the video display along a selected dimension of the graph;
   (f) receiving a point signal from the pointing device;
   (g) responsive to the activation of the drag switch by the user, if the point signal falls on the scroll bar,
      (1) receiving from the pointing device a new point signal, and
      (2) readjusting the placement of the graph on the video display along the selected dimension, wherein the point of the graph corresponding to the point signal is moved to a new location on the video display corresponding to the new point signal.

13. A process for manipulating graphical output, comprising the steps of:
   (a) storing a data structure having at least one dimension, the data structure including a plurality of data elements, each data element having at least one value for each of the at least one dimension;
   (b) generating a point signal, via a pointing device, corresponding to a location on a video display, the pointing device including a drag switch which may be activated by the user;
   (c) displaying a graph on the video display corresponding to the data elements in the data structure, wherein each dimension of the graph is displayed at a selected resolution;
   (d) defining a region on the graph on the video display within which the graph is displayed at a selected magnification.

* * * * *